United States Patent
Stephens

(10) Patent No.: US 6,934,077 B2
(45) Date of Patent: Aug. 23, 2005

(54) OPTICAL COMMUNICATION SYSTEMS INCLUDING OPTICAL AMPLIFIERS AND AMPLIFICATION METHODS

(75) Inventor: Thomas D. Stephens, Brighton (AU)

(73) Assignee: Broadwing Corporation, Columbia, MD (US)

( * ) Notice: Subject to any disclaimer, the term of this patent is extended or adjusted under 35 U.S.C. 154(b) by 0 days.

(21) Appl. No.: 10/962,726

(22) Filed: Oct. 12, 2004

(65) Prior Publication Data

US 2005/0094255 A1    May 5, 2005

Related U.S. Application Data

(63) Continuation of application No. PCT/US03/11337, filed on Apr. 14, 2003.

(60) Provisional application No. 60/371,994, filed on Apr. 12, 2002.

(51) Int. Cl.[7] .................................................. H01S 3/00
(52) U.S. Cl. ..................................................... 359/337.5
(58) Field of Search ........................... 359/334, 337.5; 398/81

(56) References Cited

U.S. PATENT DOCUMENTS

| | | | |
|---|---|---|---|
| 5,140,456 A | 8/1992 | Huber | |
| 5,887,093 A | 3/1999 | Hansen et al. | |
| 6,005,702 A | * 12/1999 | Suzuki et al. | 398/185 |
| 6,115,174 A | 9/2000 | Grubb et al. | |
| 6,178,038 B1 | 1/2001 | Taylor et al. | |
| 6,236,487 B1 | 5/2001 | Stephens | |
| 6,344,922 B1 | 2/2002 | Grubb et al. | |
| 6,344,925 B1 | 2/2002 | Grubb et al. | |
| 6,356,383 B1 | 3/2002 | Cornwell, Jr. et al. | |
| 6,529,315 B2 | * 3/2003 | Bartolini et al. | 359/334 |
| 6,741,389 B2 | * 5/2004 | Kumasako et al. | 359/334 |
| 6,747,788 B2 | * 6/2004 | Kinoshita | 359/334 |

FOREIGN PATENT DOCUMENTS

JP       411174504 A   *   7/1999

OTHER PUBLICATIONS

International Search Report for PCT/US03/11337.

* cited by examiner

Primary Examiner—Mark Hellner

(57) ABSTRACT

Optical systems of the present invention includes power sources that provide dedicated and shared power to a plurality of optical amplification sections. In various embodiments, multiple optical pump sources are provided the include a plurality of optical sources, which supply dedicated optical pump power and shared optical pump power to two or more optical amplification sections. In other embodiments, remote dispersion compensation is performed and Raman amplification is provided to overcome at least a portion of the loss.

29 Claims, 8 Drawing Sheets

OPTICAL COMMUNICATION SYSTEMS INCLUDING OPTICAL AMPLIFIERS AND AMPLIFICATION METHODS

CROSS-REFERENCE TO RELATED APPLICATIONS

This application is a continuation of PCT patent application No. PCT/US03/11337, filed Apr. 14, 2003, which is a continuation-in-part and claims priority from U.S. Provisional Application No. 60/371,994, filed Apr. 12, 2002, all of which are incorporated herein by reference.

STATEMENT REGARDING FEDERALLY SPONSORED RESEARCH OR DEVELOPMENT

Not Applicable

BACKGROUND OF THE INVENTION

The present invention is directed generally to optical systems. More particularly, the invention relates to optical systems including optical amplifiers and methods for use therein.

The continued growth in traditional communications systems and the emergence-of the Internet as a means for accessing and communicating information has accelerated demand for high capacity communications networks. Telecommunications service providers, in particular, have looked to wavelength division multiplexed ("WDM") transmission systems to increase the capacity of their optical fiber networks to meet the increasing demand.

In WDM transmission systems, distinct wavelength ranges that are useful for transmission through a transmission medium are allocated to carry separate information streams simultaneously within the medium. Analogously, distinct frequency ranges can be allocated to carry separate information streams in frequency division multiplexed ("FDM") systems. The wavelength/frequency ranges of WDM, FDM, and other systems carrying multiple information streams are often referred to signal wavelengths/frequencies, or signal channels. The ranges are characterized by a center wavelength/frequency, which is typically the mid-point of the wavelength/frequency range. The ranges also may be characterized in other manners, such as the wavelength/frequency of maximum power or a relative to reference wavelength/frequency.

In WDM systems, signal channels are transmitted using electromagnetic waves within the distinct wavelength ranges in the optical spectrum, typically in the infrared wavelength range. Each signal channel can be used to carry a single information stream or multiple information streams that are electrically or optically time division multiplexed ("TDM") together into a TDM information stream.

The pluralities of information carrying wavelengths are combined into a multiple channel, "WDM", optical signal that is transmitted in a single waveguide. In this manner, WDM and other multiple channel systems can increase the transmission capacity of space division multiplexed ("SDM"), i.e., single channel, optical systems by a factor equal to the number of channels in the multiple channel system.

The development of optical amplifiers capable of simultaneously amplifying multiple optical signals greatly reduced the cost of optical systems, and WDM systems in particular. This capability essentially eliminated the need for expensive electronic repeater equipment to separate and repeat each signal electrically merely to overcome signal attenuation.

While the development of optical amplifiers has greatly reduced the equipment costs and increased reliability associated with amplifiers in optical systems, there remain operational concerns. A failure in an optical amplifier could prevent optical signals from passing through the amplifier and the system. As such, various techniques have been developed to mitigate the impact of a failure in an optical amplifier. For example, redundant pump lasers, or pumps, have been used to provide optical, or "pump", power to the amplifier, so that failure of a pump laser would not cause a failure of the amplifier. However, the additional cost associated with redundant pumps often does not provide a cost effective solution to this problem. Alternatively, pump power from a multiple pump lasers can been combined and shared among two or more amplifiers to minimize or eliminate the cost associated with pump laser redundancy. However, the sharing of pump lasers requires that the amplifiers be operated in tandem, which significantly constrains the operation of the individual amplifiers.

In addition, the amount of optical amplification required in a system depends upon the system design. For example, various system designs require chromatic dispersion compensation to reduce the detrimental impact on a signal of chromatic dispersion, which inherently results from multiwavelength signal propagation through a transmission fiber. Various techniques have been developed to compensate for chromatic dispersion in the fiber. The most commonly used technique involves the use of dispersion compensating fiber ("DCF"), which has been designed to have dispersion characteristics opposite that of a transmission fiber or a second transmission fiber is used that has different dispersion characteristics than the transmission fiber used in a span and/or system. Some DCF is designed to have significantly more dispersion, e.g., 10x, than the transmission fiber, such that shorter lengths of DCF are required to compensate for the dispersion in the transmission fiber. The design of DCF typically results in a fiber that has a substantially smaller core size, i.e., ½ the diameter of standard single mode fiber.

A problem with DCF is that the DCF can have a significant amount of loss associated with it, which can be, for example, as high as 10 dB or more. To address this problem, DCF is typically deployed proximate, and in combination with, one or more collocated optical amplifiers. However, it is not generally desirable to place DCF proximate the input of an optical amplifier. This is because the additional loss will decrease the input signal power to the optical amplifier, thereby degrading the optical signal to noise ratio ("OSNR") and effective noise figure of the optical amplifier. Conversely, it is not desirable to place DCF proximate the output of an optical amplifier. This is due to the small core size of the DCF, which can dramatically increase the non-linear signal interactions and degrade the optical signal to noise ratio ("OSNR") and effective noise figure of the optical amplifier. As such, DCF is typically placed proximate, i.e., between, two amplifiers, amplification sections, or amplifier stages. In this location, the signal power entering is higher than at the input to the first amplification section and lower than the output of the second amplification section. However, even in this location, the signal channel powers and non-linear interactions are high and the optical amplifiers and system must be designed to accommodate the additional loss and performance degradation resulting from the DCF. Some efforts have been made to ameliorate the loss by providing Raman gain in the DCF between the amplifier stages. However, these efforts, while reducing the effective loss through the DCF can actually increase the signal channel power and non-linear interactions within the DCF.

There is a continuing interest in the development of higher performance, lower cost communication systems. As such, there is a continuing need for improved optical systems, amplifiers and amplification methods.

BRIEF SUMMARY OF THE INVENTION

The systems, apparatuses, and methods of the present invention address the above need for improved optical systems and optical amplifiers and amplification methods for use therein. Optical systems of the present invention include power sources that provide dedicated and shared power to a plurality of optical amplification sections. In various embodiments, multiple optical pump sources are provided the include a plurality of optical sources, which supply dedicated optical pump power and shared optical pump power to two or more optical amplification sections.

The shared sources provides a continuing source of pump power to each amplification section in the event of a failure of one or more of the shared sources up to the total number of shared sources. Whereas, the dedicated pump power provides for independent control of the optical amplifier. In various embodiments, multiple pump source modules can be used to provide the shared and dedicated pump power to the optical amplifiers. In this manner, the failure of a pump source module does not result in a complete loss of either shared or dedicated pump power to any of the optical amplifiers. In addition, the use of shared and dedicated sources allows more efficient use of pump power-in the system.

In various embodiments, optical sources, such as diode and/or fiber lasers, are used to provide shared and dedicated optical "pump" power to multiple amplification sections, such as rare earth (e.g., Er) doped and nonlinear (e.g., Raman) amplification sections. Shared and dedicated sources can be used to provide pump power to localized single and multiple stage erbium doped fiber amplifiers ("EDFA") and Raman amplifiers, as well as to distributed amplifiers.

In various embodiments, pump power can be shared between concatenated amplification sections. For example, pump power can be used to provide distributed Raman gain in a transmission fiber, and also to provide Raman gain in a remotely located, non-transmission fiber, such as dispersion compensating fiber. In this manner, components, such as DCF, can be deployed remotely to vary the signal channel characteristics and gain can be provided to compensate for at least a portion of component insertion losses and/or provide excess gain.

The DCF fiber is positioned remotely from discrete amplifiers, such that the combination of a lower input power to the DCF and Raman gain within the DCF improves the OSNR and effective noise figure performance of the span relative to positioning the DCF proximate discrete optical amplifiers. For example, a DCF having a core size that is ½ the core size of the transmission fiber can be placed where the signal channel power is at least 6 dB lower than the peak signal channel power in the transmission fiber, the incremental non-linear phase shift introduced by the DCF will not exceed the incremental non-linear phase shift introduced by a comparable section of the transmission fiber. In addition, if Raman gain is provided in the remote DCF to overcome at least some of the loss of the DCF or provide gain, the power requirements and noise figure of the discrete amplifiers will be reduced, thereby improving system performance.

The present invention provides optical amplifiers and amplification methods with increased reliability and more efficient power utilization that can provide improved optical systems. These advantages and others will become apparent from the following detailed description.

BRIEF DESCRIPTION OF THE DRAWINGS

Embodiments of the present invention will now be described, by way of example only, with reference to the accompanying schematic drawings for the purpose of illustrating embodiments only and not for purposes of limiting the same, wherein.

DESCRIPTION OF THE INVENTION

Figure 1:
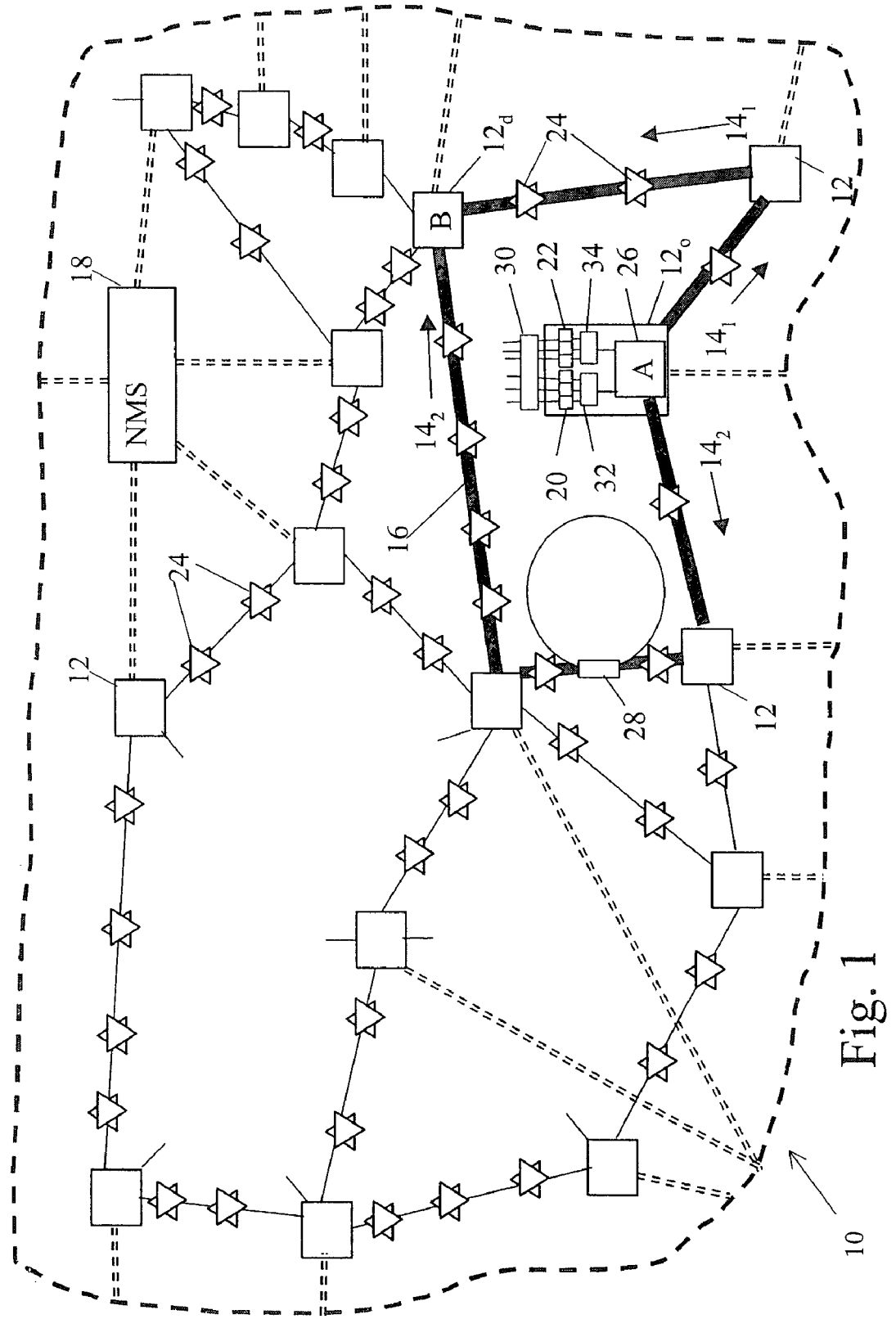
FIGS. 1 and 2 illustrate optical system embodiments.

FIG. 1 illustrates an optical system 10, which includes a plurality of nodes 12 connected by optical communication paths 14. Advantages of the present invention can be realized with many system 10 configurations, topologies, and architectures. For example, an all optical network, one or more interconnected point to point optical links (FIG. 2), and combinations thereof can be configured in various topologies, i.e., rings, mesh, etc. to provide a desired network connectivity.

The system 10 can support one or more transmission schemes, such as space, time, polarization, code, wavelength and frequency division multiplexing, etc., singly or in combination within a network to provide communication between the nodes 12. The system 10 can include various types of transmission media 16 and be controlled by a network management system 18.

As shown in FIG. 1, optical processing nodes 12 generally can include one or more optical components, such as transmitters 20, receivers 22, amplifiers 24, optical switches 26, optical add/drop multiplexers 28, and interfacial devices 30. For example, in WDM embodiments, the node 12 can include optical switches 26 and interfacial devices 30 along with multiple transmitters 20, receivers 22, multiplexers, demultiplexers, and associated equipment, such as processors, monitors, power supplies, system supervisory and network and element management equipment, etc.

The optical processing nodes 12 can be configured via the network management system 18 in various topologies. For example, the deployment of integrated transport optical switches 26, and optical add/drop multiplexers 28 as integrated switching devices in intermediate nodes $12_i$ can provide all-optical interconnections between the transmitters 20 and receivers 22 located in non-adjacent origination and destination nodes, $12_o$ and $12_d$, respectively. The use of integrated transport switching devices in the system 10 in this manner provides for distance independent all-optical networks, sub-networks, and/or nodal connections.

In various network embodiments, multiple paths, e.g., $14_1$ and $14_2$, can be provided between nodes 12. The optical path 14 between adjacent nodes 12 is referred to generally as an optical link. The optical communication path 14 between adjacent optical components, typically optical amplifiers, along the link is referred to generally as a span.

Various guided and unguided transmission media 16, such as fiber, planar, and free space media, can be used to form the optical communication paths 14. The media 16 supports the transmission of information between originating nodes $12_o$ and destination nodes $12_d$ in the system 10. As used herein, the term "information" should be construed broadly to include any type of audio, video, data, instructions, or other signals that can be transmitted.

The transmission media 16 can include one or more optical fibers interconnecting the nodes 12 in the system 10. Various types of fiber, such as dispersion shifted ("DSF"), non-dispersion shifted ("NDSF"), non-zero dispersion shifted ("NZDSF"), dispersion compensating ("DCF"), and polarization maintaining ("PMF") fibers, doped, e.g. Er, Ge, as well as others, can be deployed as transmission fiber to interconnect nodes 12 or for other purposes in the system 10. The fiber typically can support either unidirectional or bi-directional transmission of optical signals in the form of one or more information carrying optical signal wavelengths $\lambda_{si}$, or "channels". The optical signal channels in a particular path 14 can be processed by the optical components as individual channels or as one or more wavebands, each containing one or more optical signal channels.

Network management systems ("NMS") 18 can be provided to manage, configure, and control optical components in the system 10. The NMS 18 generally can include multiple management layers, which can reside at one or more centralized locations and/or be distributed among the optical components in the network. The optical components, such as those described herein, e.g., see paragraph [0026], can be grouped logically as network elements for the purposes of network management. One or more network elements can be established at each optical component site in the network depending upon the desired functionality in the network and management system.

The NMS 18 can be connected directly or indirectly to network elements located either in the nodes 12 or remotely from the nodes 12. For example, the NMS 18 may be directly connected to network elements serving as a node 12 via a wide area or data communication network ("WAN" or "DCN", depicted via broken lines in FIG. 1). Indirect connections to network elements that are remote to the DCN can be provided through network elements with direct connections. Mixed data or dedicated supervisory channels can be used to provide connections between the network elements. The supervisory channels can be transmitted within and/or outside the signal wavelength band on the same medium or a different medium depending upon the system requirements.

The optical transmitters 20 transmit information as optical signals via one or more signal channels $\lambda_{si}$ through the transmission media 16 to optical receivers 22 located in other processing nodes 12. The transmitters 20 used in the system 10 generally include an optical source that provides optical power in the form of electromagnetic waves at one or more optical wavelengths. The optical source can include various coherent narrow or broad band sources, such as DFB and DBR lasers, sliced spectrum sources and fiber and external cavity lasers, as well as suitable incoherent optical sources, e.g., LED, as appropriate. The sources can have a fixed output wavelength or the wavelength can be tunable using various feedback and control techniques, such as temperature, current, and gratings or other components or means for varying the resonance cavity of the laser or output of the source.

Information can be imparted to the electromagnetic wave to produce an optical signal carrier either by directly modulating the optical source or by externally modulating the electromagnetic wave emitted by the source. Alternatively, the information can be imparted to an electrical carrier that can be upconverted, or frequency shifted, to an optical signal wavelength $\lambda_{si}$ Electro-optic (e.g., $LiNbO_3$), electro-absorption, other types of modulators and upconverters can be used in the transmitters 20.

In addition, the information can be imparted using various modulation formats and protocols. For example, various amplitude modulation schemes, such as non-return to zero (NRZ), differential encoding, and return to zero (RZ) using various soliton, chirped, and pulse technologies. Various frequency, phase, and polarization modulation techniques also can be employed separately or in combination. One or more transmission protocols, such as SONET/SDH, IP, ATM, Digital Wrapper, GMPLS, Fiber Channel, Ethernet, etc. can be used depending upon the specific network application. It will be appreciated that the transmitters 20 and receivers 22 can use one or more modulation formats and transmission protocols within the network.

The optical receiver 22 used in the present invention can include various detection techniques, such as coherent detection, optical filtering and direct detection, and combinations thereof. The receivers 22 can be deployed in modules that have incorporated wavelength selective demultiplexers to filter a specific channel from a WDM signal or channel demultiplexing can be performed outside of the receiver module. It will be appreciated that the detection techniques employed in the receiver 22 will depend, in part, on the modulation format and transmission protocols used in the transmitter 20.

Generally speaking, N transmitters 20 can be used to transmit M different signal wavelengths to J different receivers 22. Also, tunable transmitters 20 and receivers 22 can be employed in the optical nodes 12 in a network, such as in FIG. 1. Tunable transmitters 20 and receivers 22 allow system operators and network architects to change the signal wavelengths being transmitted and received in the system 10 to meet their network requirements. The transmitters 20 and receivers 22 can be adjusted dynamically using various feedback loops or operated independently.

Figure 2:
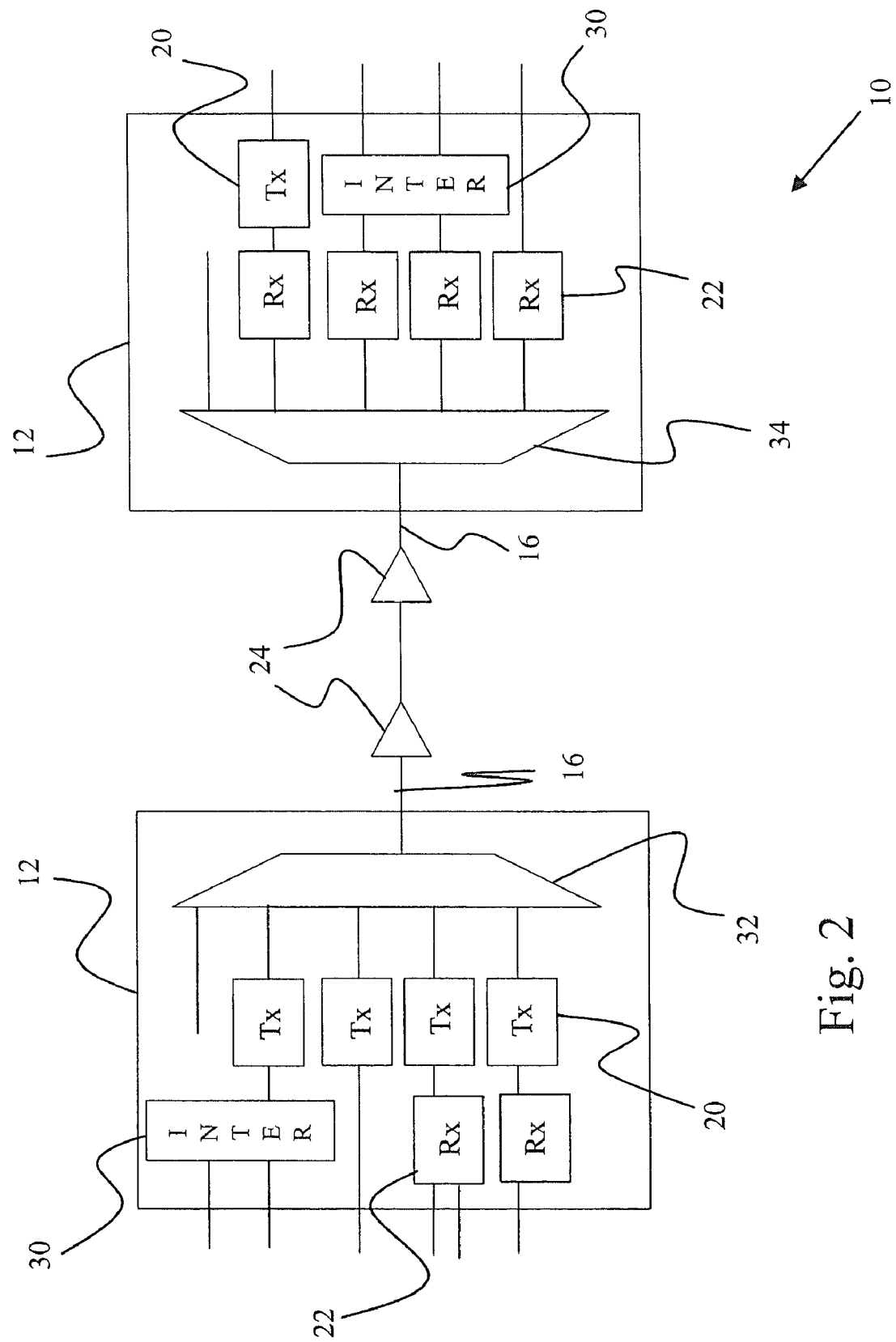

In addition, the transmitters 20 and receivers 22 can include various components to perform other signal processing, such as reshaping, retiming, error correction, differential encoding, protocol processing, etc. using serial and/or parallel techniques. For example, receivers 22 can be connected to the transmitters 20 in back to back configuration as a transponder or regenerator, as shown in FIG. 2. The back-to-back configuration can include various levels of functionality depending upon whether it serves as a 1R (repeat or retransmit), 2R (reshape & repeat), or 3R regenerator (reshape, retime, repeat).

In multiple channel systems, the transmitters 20 and receivers 22 can be operated in a uniform manner or the transmission and reception characteristics of the signal channels can be tailored individually and/or in groups. For example, pre-emphasis, optical and/or electrical pre- and post-dispersion and distortion compensation can be performed on each channel or groups of channels.

In FIG. 2, it will be appreciated that the transmitters 20 and receivers 22 can be used in multiple and single channel systems, as well as to provide short, intermediate, and/or long reach optical interfaces between other network equipment and systems. For example, transmitters 20 and receivers 22 deployed in a WDM system can be included on one or more modules, or circuit packs or line cards, that includes standardized interface receivers and transmitters, respectively, to provide communication with interfacial devices 30, as well as other transmission and processing systems. In addition, the transmitters 20 and receivers 22 can be integrated into the input and output interfaces on interfacial devices 30.

The optical amplifiers 24 can be deployed along optical links 15 to overcome attenuation that occurs in a span of transmission media 16. In addition, optical amplifiers 24 can be provided proximate to other optical components, for example, at the node 12 as booster/post-amplifiers and/or pre-amplifiers to provide gain to overcome component losses. The optical amplifiers 24 can include doped (e.g. Er, other rare earth elements, etc.) and non-linear interaction (e.g., Raman, Brillouin, etc.) fiber amplifiers that provide stimulated amplification. Various amplifiers and control schemes can be used in the present invention, such as those described in U.S. Pat. Nos. 6,115,174, 6,236,487, 6,344,922, 6,344,925, and 6,356,383, which are incorporated herein by reference. Other types of optical amplifiers, such as semiconductor amplifiers, can be used in lieu of, or in combination with optically pumped fiber and other waveguide amplifiers.

Two or more amplifiers 24 may be co-located and concatenated to provide additional flexibility. Each optical amplifier 24 can include one or more serial and/or parallel stages that provide localized gain at discrete sites in the network and/or gain that is distributed along the transmission media 16. One or more other functions can be performed between the amplifiers and/or stages of the amplifiers. For example, optical regeneration, dispersion compensation, isolation, filtering, add/drop, switching, etc. can be included at a site along with the optical amplifiers 24.

Various types of optical switching devices, both optical switches 26 and OADMs 28, can be integrated into the nodes 12 and the all-optical networking functionality of the devices can be used to establish distance independent networks. The switching devices allow for integrated optical transport switching, adding, dropping, and/or termination of signal channels from multiple paths 14 entirely in the optical domain. The switching devices 26/28 eliminate the need for receivers 22 and transmitters 20 to perform electrical conversions, as required when using interfacial devices 30, merely to pass the information through intermediate nodes $12_i$. As such, signal channels can optically pass through intermediate nodes $12_i$ between the origin nodes $12_o$ and destination nodes $12_d$ bypassing the need for transmitters 20 and receivers 22 at the intermediate nodes $12_i$. In this manner, the switching devices provide optical transparency through intermediate nodes $12_i$ that allows all-optical, sometimes called "express", connections to be established between non-adjacent origin and destination nodes, $12_o$ and $12_d$, respectively, in a network.

The signal channels optically passing through the switching devices can be distributed from a common path to multiple diverse paths, as well as combined from multiple diverse paths onto a common path. It will be appreciated that signal channels that are switched onto a common path by the switching devices from different paths can have different properties, such as optical signal to noise ratio. Conversely, signal channels entering the switching devices from a common path and exiting the devices via different paths may require that the signal channels exit with different properties, such as power level. As such, signal channels may have different span loss/gain requirements or tolerances within the link 15.

The optical switches 26 and OADMs 28 can be configured to process individual signal channels or signal channel groups or wavelength bands including one or more signal channels. The switching devices also can include various wavelength selective or non-selective switch elements, combiners 32, and distributors 34. The transmitters 20 and receivers 22 can be configured to transmit and receive signal channels dynamically through the switch elements or in a dedicated manner exclusive of the switch elements using various combiners 32 and distributors 34. The OADMs can include channel reusable and non-reusable configurations. Similarly, the switching devices can be configured to provide multicast capability, as well as signal channel terminations.

The switching devices can include various configurations of optical combiners 32 and distributors 34, such as channel multiplexers and demultiplexers, passive splitters and couplers described below, used in combination with various switch elements configured to pass or block the signals destined for the various other nodes 12 in a selective manner. The switching of the signals can be performed at varying granularities, such as line, group, and channel switching, depending upon the degree of control desired in the system 10.

The switch element can include wavelength selective or non-selective on/off gate switch elements, as well as variable optical attenuators having suitable extinction ratios. The switch elements can include single and/or multiple path elements that use various techniques, such as polarization control, interferometry, holography, etc. to perform the switching and/or variable attenuation function. The switching devices can be configured to perform various other functions, such as filtering, power equalization, dispersion compensation, telemetry, channel identification, etc., in the system 10.

Various two and three dimensional non-selective switch elements can be used in present invention, such as mechanical line, micro-mirror and other micro-electro-mechanical systems ("MEMS"), liquid crystal, holographic, bubble, magneto-optic, thermo-optic, acousto-optic, electro-optic (LiNbO$_3$), semiconductor, erbium doped fiber, etc. Alternatively, the switch elements can employ fixed and tunable wavelength selective multi-port devices and filters, such as those described below. Exemplary switching devices are described in PCT Application No. PCT/US00/23051, which is incorporated herein by reference.

The interfacial devices 30 may include, for example, protocol and bit rate independent devices, such as optical switches, and/or protocol and bit rate dependent electrical switch devices, such as IP routers, ATM switches, SONET add/drop multiplexers, etc. that operate at or between various networking layers (e.g., 1, 2, 3) and bit rates. The interfacial devices 30 can be configured to receive, convert, aggregate, groom, and/or disassemble, and provide information in one or more various protocols, encoding schemes, and bit rates to one or more transmitters 20. The interfacial devices can be employed to perform the converse function in combination with the receivers 22. The interfacial devices 30 also can be used as an input/output cross-connect switch or automated patch panel and to provide protection switching in various nodes 12 depending upon the configuration. The interfacial devices 30 can be electrically connected to the transmitters 20 and receivers 22 or optically connected using standard interface and/or WDM transmitters and receivers, as previously described.

Optical combiners 32 can be provided to combine optical signals from multiple paths into a multiple channel signal on one or more common paths, e.g. fiber, such as from multiple transmitters 20 or in optical switching devices. Likewise, optical distributors 34 can be provided to distribute one or more optical signals from one or more common paths to a plurality of different optical paths, such as to multiple receivers 22 and/or optical switching devices 26/28.

The optical combiners 32 and distributors 34 can include wavelength selective and non-selective ("passive") fiber, planar, and/or free space devices, as well as polarization sensitive devices. For example, one or more multi-port devices, such as passive, WDM, and polarization couplers having various coupling ratios, circulators, dichroic devices, prisms, diffraction gratings, arrayed waveguides, etc. can be employed used in the combiners 32 and distributors 34. The multi-port devices can be used alone, or in various combinations of filters, such as tunable or fixed, high, low, or band pass or band stop, transmissive or reflective filters, including Bragg gratings, Fabry-Perot, Mach-Zehnder, and dichroic filters, etc. Furthermore, one or more serial or parallel stages incorporating various multi-port device and/or filter combinations can be used in the combiners 32 and distributors 34 to multiplex, demultiplex, and multi-cast signal wavelengths Xi in the optical systems 10.

In the present invention, one or more optical amplifiers 24 are provided with pump energy, i.e., pump power, from one or more of the same sources. In addition, one or more sources provide pump power to only one of the amplifiers 24. As such, at least one of the optical amplifiers 24 is supplied with pump power from at least one shared source and from at least one dedicated source.

Exemplary optical amplifier embodiments of the present invention can include one or more amplification sections 36 having an amplifying fiber, or other waveguide, supplied with optical energy, or "pump power", from one or more pump sources 38. The amplification sections can be disposed in the same or different transmission fibers and can amplify optical signal channels passing through the amplification sections in one or both directions depending upon the system. The pump sources 38 can include one or more narrow band or broad band optical sources 40 that provide optical power in one or more pump wavelength ranges. The pump power is typically referenced by center pump wavelengths $\lambda_{pi}$ and includes one or more spatial and/or longitudinal modes cover a wavelength range. The pump power can be combined in one or more stages to the amplification sections using various combiners 32, such as those previously described. Pump power can be supplied to the amplifying fiber from locally and/or remotely located pump sources 38 and counter- and/or co-propagated with the signal channels $\lambda_{si}$ passing through the amplifying fiber.

Pump power can be shared: 1) in parallel, by splitting the pump power and providing a portion of the pump power to multiple amplification sections; and/or 2) in series, by passing at least a portion of the pump power through multiple amplification sections. Pump power being shared in parallel from multiple optical sources 40 generally will pass through a combiner/distributor 32/34, such as those described above, which couples the pump power to multiple amplification sections 36.

The amplifying fiber, or other waveguide, used in the amplification sections can have the same or different transmission and amplification characteristics than the transmission fiber. Thus, the amplification sections can serve multiple purposes in the optical system 10, such as performing dispersion compensation, as well as different levels of amplification of the signal channels $\lambda_{si}$.

Figure 3:
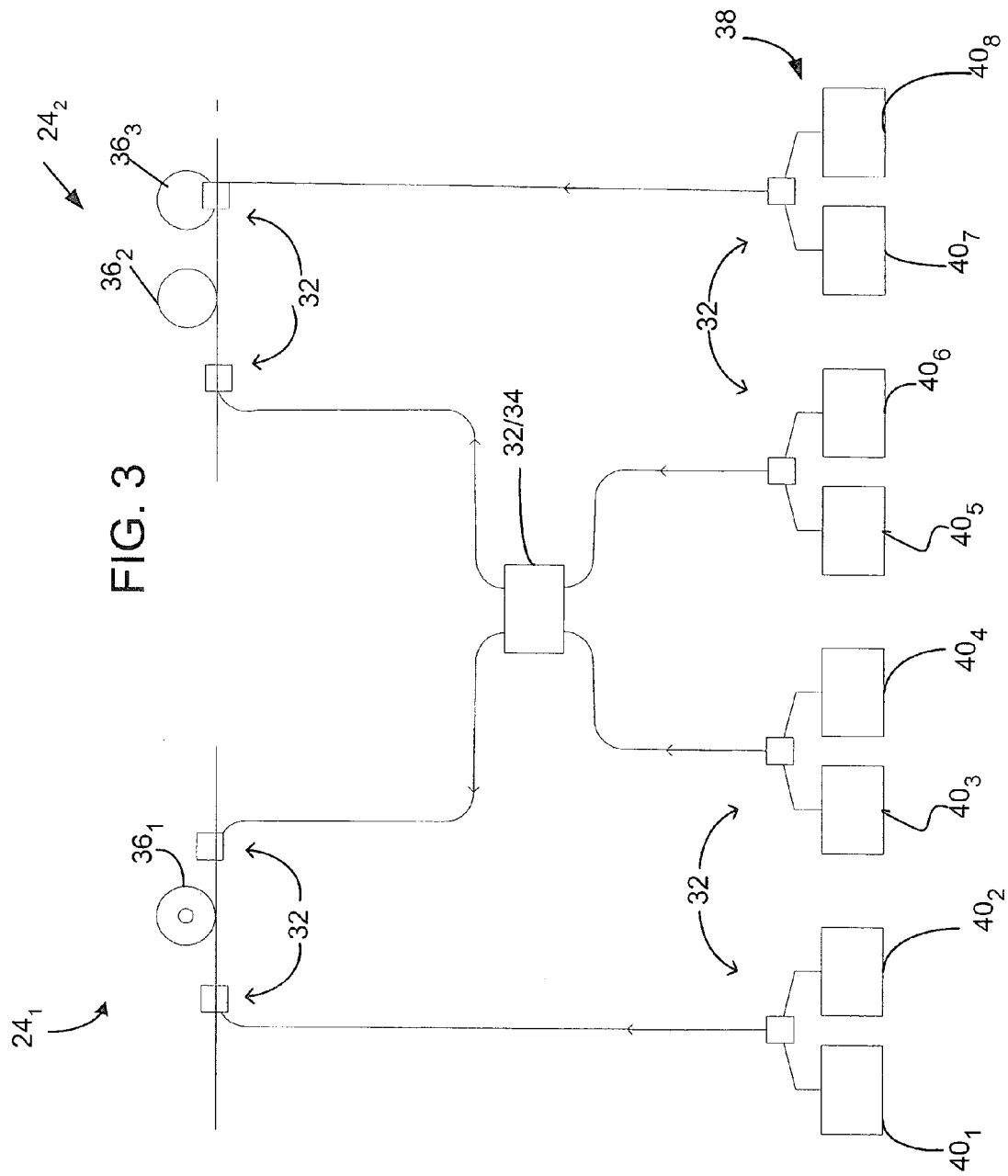
FIGS. 3–8 illustrate exemplary optical amplifier embodiments.

In FIG. 3 embodiments, first, second, and third amplification sections, $36_1$, $36_2$, and $36_3$, are provided with pump power from a plurality of optical sources, $40_{1-8}$. The amplification sections can employ the same or different amplification mechanism and can be included in separate amplifiers on the same or different transmission paths or as multiple stages of one amplifier. It will be appreciated that pump source 38 in FIG. 3 can be embodied as multiple pump sources, as will be further described hereinafter.

As shown in FIG. 3, optical sources $40_{1-2}$ and $40_{7-8}$ provide dedicated optical sources used to provide power to, or "pump", the first and third amplification section $36_1$ and $36_3$. Optical sources $40_{3-6}$ provide shared optical sources used to pump first and second amplification sections $36_1$ and $36_2$ sections via combiner/distributor 32/34, which can be, for example, a passive or wavelength selective coupler. It will be appreciated that pump power can be further shared in either or both directions by passing it through both second amplification section $36_2$ and the third amplification section $36_3$, if the amplification sections are not isolated with respect to pump power.

The optical sources $40_{1-8}$ can include various coherent narrow or broad band sources, such as DFB and DBR lasers, fiber and external cavity lasers, as well as suitable incoherent optical sources, e.g., LED and optical noise sources, as appropriate. The wavelengths of optical sources 40, i.e., the pump wavelengths, used to pump the amplification sections will depend upon the amplification technique and the signal channel wavelength range. For example, 980 nm range and 1480 nm range DFB lasers and fiber lasers can be used as optical sources, when erbium fiber is used as the amplification media for signal channels in the S, C, and L bands. Similarly, for example, DFB lasers and fiber lasers having pump wavelengths ranging from 1300–1600 nm can be used as optical sources for Raman amplifiers depending upon whether the signal channel $\lambda_{si}$ wavelength range is in the S, C, and/or L signal wavelength ranges.

Figure 4:
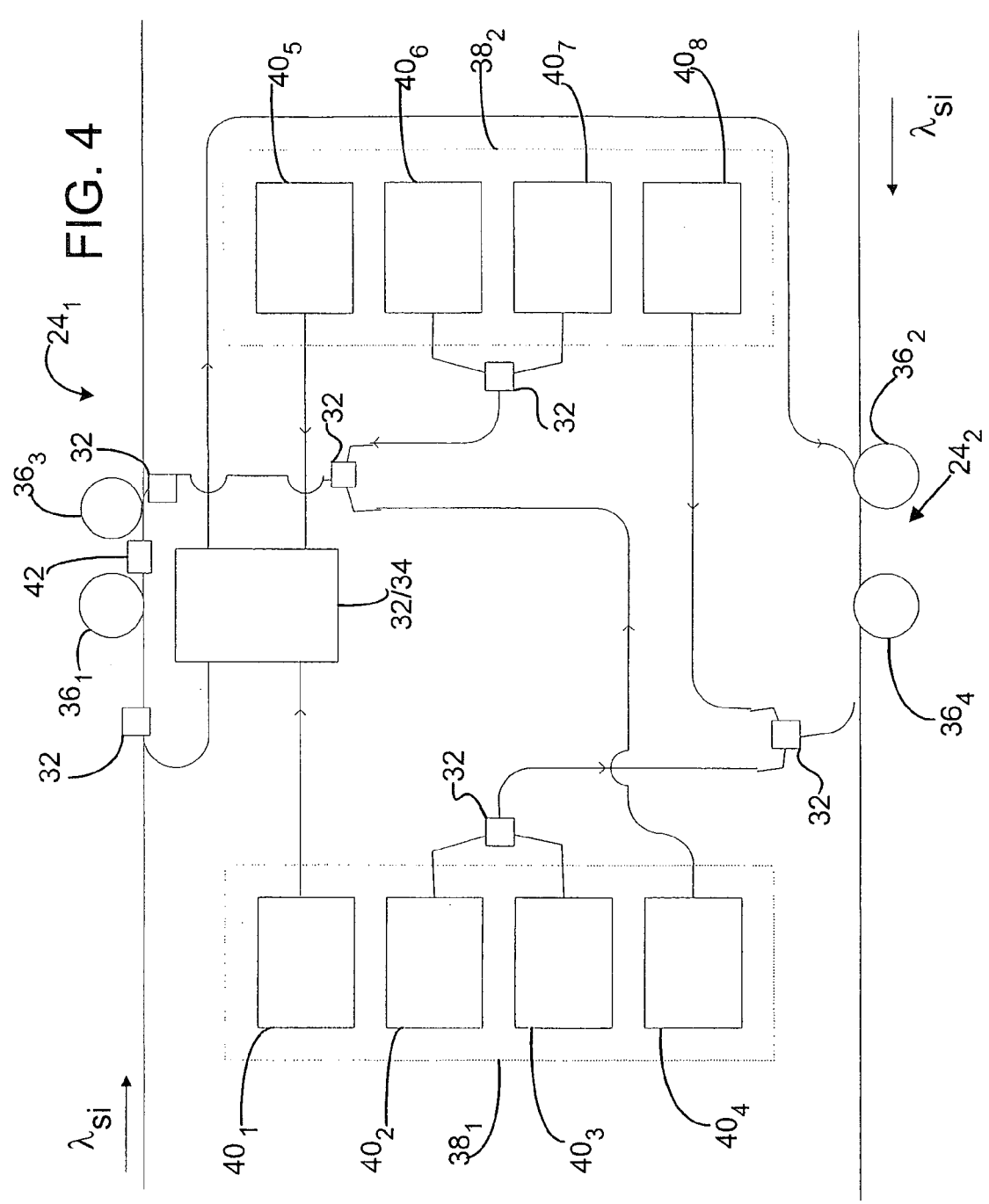

FIGS. 4–7 show additional exemplary embodiments, in which multiple pump sources 38 are used to provide pump power to multiple amplifier configurations. In FIG. 4, two optical sources, $40_1$ and $40_5$, serve as shared sources to provide pump power to two amplifiers, $24_1$ and $24_2$. Optical sources $40_{2, 3, \& 8}$ and $40_{4, 6, \& 7}$, serve as dedicated sources to provide pump power to two amplifiers, $24_1$ and $24_2$, respectively. In FIG. 4 configurations, the optical sources 40 are provided in multiple pump sources, $38_1$ and $38_2$, such that each of the amplifiers, $24_1$ and $24_2$, is provided with shared and dedicated pump power from multiple pump sources 38. The multiple pump sources 38 can be housed on physically separate modules on a common or different module slot or shelf or in the same or different racks.

The use of multiple pump sources to supply both shared and dedicated pump power provides additional reliability for the amplifiers 24. In multiple pump source configurations, the failure of one pump source will decrease the amount of pump power provided to an amplifier 24, instead of causing a complete loss of pump power and failure of the amplifier 24.

The independent survivability of the pump sources 38 and also the equipment cost will increase depending upon the relative separation of the various pump sources. For example, having at least two pump sources 38 will allow some pump power to be maintained in the event one of the pump sources fails. Housing pump sources 38 in different slots within a shelf will allow some pump power to be maintained if one of the pump sources or the shelf slot fails. Continuing the example, having pump sources in different shelves and then different racks will increase further the probability that one or more of the pump sources will survive a failure in the equipment.

One will appreciate further that the number of pump sources 38 and optical sources 40 within each pump source 38, as well as the amount of pump power that can be supplied by each pump source 38 can be selected to accommodate various price and redundancy requirements. For example, two pump sources can be used as shared sources to provide power to two or more amplifying media. If one pump source 38 fails, then each amplifier 24 will receive some percentage of pump power from the pump source 38 that is still operating. Alternatively, each of the two pump sources 38 could be designed to supply all of the pump power required for the amplifiers 24. When both pump sources 38 are operating, each will provide some percentage, e.g., 50%, of the pump power to each amplifier 24. In the event of a pump source failure, a feedback control loop or other control mechanism could be used to increase the pump power of the remaining operating pump sources 38 to provide full power to each amplifier 24.

The combiners/distributors 32/34 used to share pump power between multiple amplifying media 36 can be a passive or wavelength selective coupler of a suitable coupling ratio to combine pump power from the various optical sources 40 and splits the power the required number of times to provide shared power to the amplification sections. It will be appreciated that shared power can be provided to an amplification section at one or more points proximate or within the amplification section.

As shown in FIG. 4, various optical devices 42 can be deployed between the first and third amplification sections, 36, and 363, to perform various functions in the system 10. The devices 42 can be, for example, an optical isolator, gain flattening filters, fixed and variable attenuators, etc. as well as various monitoring and access ports. Optical isolator can be used to pass or block pump power co-propagating with the signal channels $\lambda_{si}$ from the first amplification section $36_1$ to the third amplification section $36_3$. Whereas, the isolator generally is used to block pump power passing through the third amplification section $36_3$ from reaching the first amplification section $36_1$. The shared pump power will be provided to both the first and third amplification sections, $36_1$ and $36_3$, while the dedicated pump power is provided only to the third amplification section $36_3$.

Figure 5:
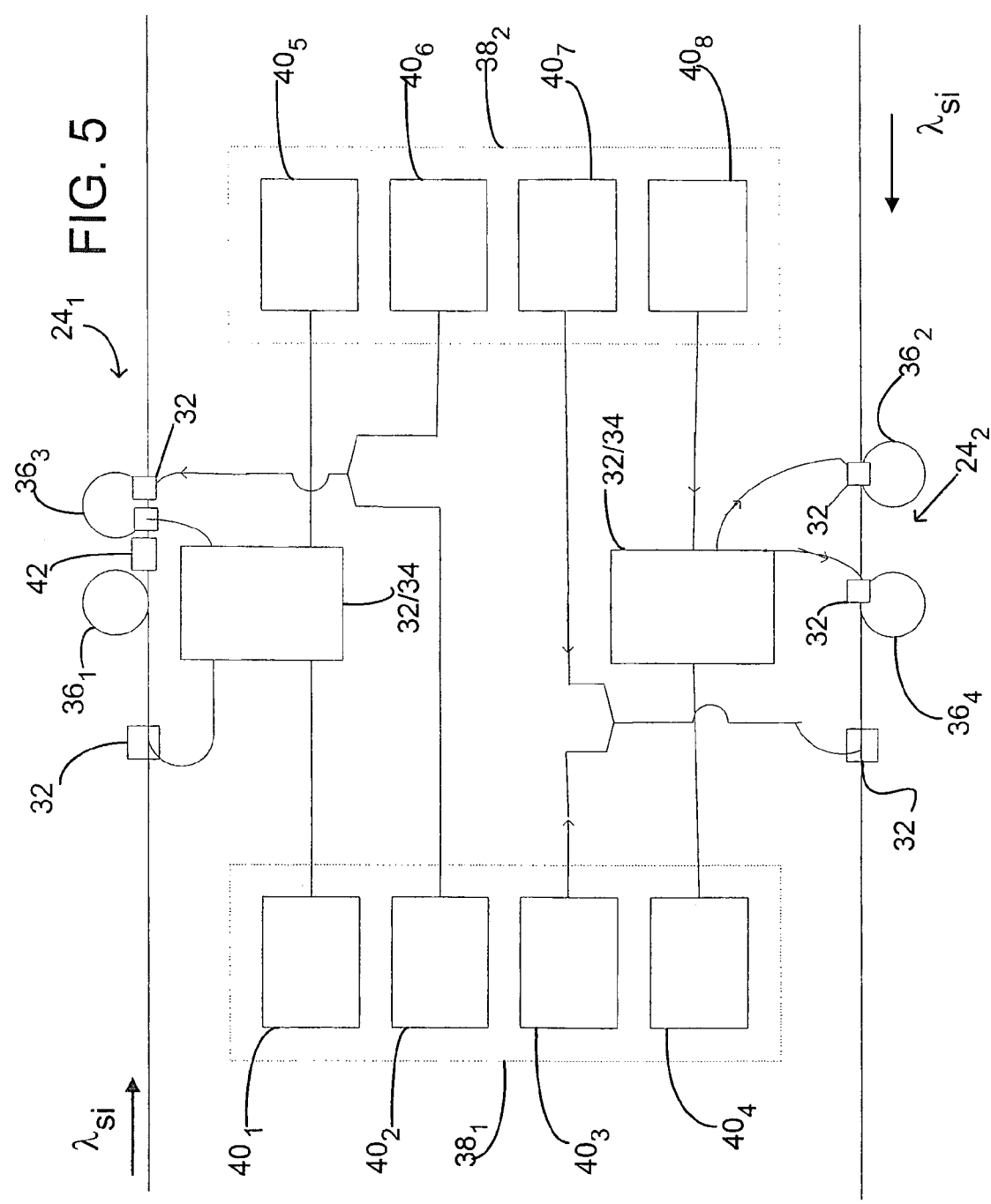

FIG. 5 depicts other embodiments in which four optical sources, $40_{1 \& 5}$ and $40_{4 \& 8}$, serve as shared sources to provide pump power to two amplification sections of respective amplifiers, $24_1$ and $24_2$. In addition, four optical sources, $40_{2, 3,}$ and $40_{6 \& 7}$ serve as dedicated sources to provide pump power to the third and fourth amplification sections, $36_3$ and $36_4$, of the amplifiers $24_1$ and $24_2$, respectively. In FIG. 5 configurations, the optical sources 40 also can be provided in multiple pump sources, $38_1$ and $38_2$, which could be embodied as separate modules or line cards within a common shelf to provide power to the amplifier 24, also resident on the shelf.

Figure 6:
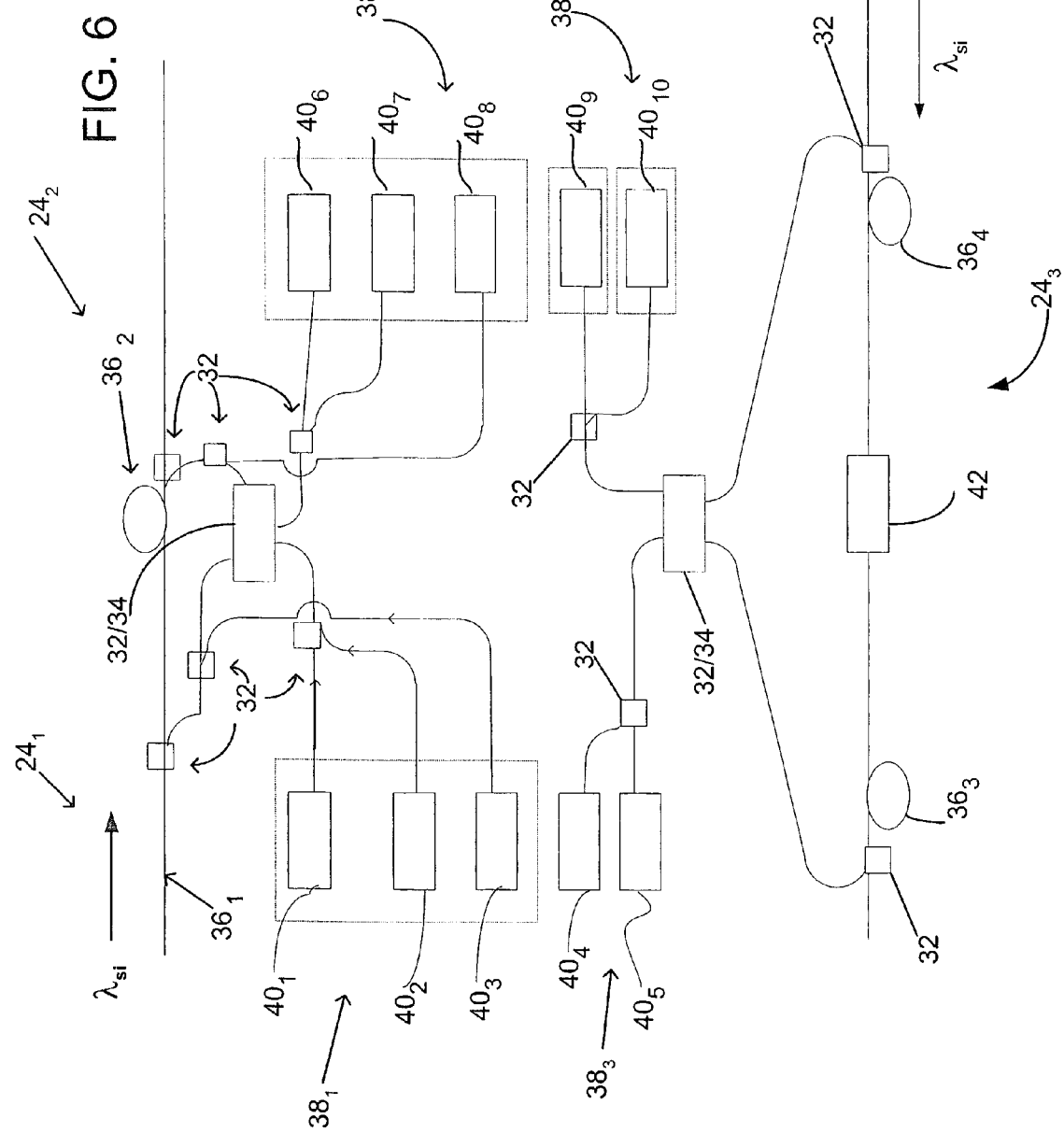

FIG. 6 shows an exemplary embodiment in which pump power is shared between distributed and discrete amplification sections, $36_1$ and $36_2$, and between two discrete, also referred to as concentrated, localized or lumped, amplification sections, $36_3$ and $36_4$. The shared and dedicated pump power can be at the same or different wavelengths depending upon the particular amplifier design. For example, the shared pump power provided to amplification sections, $36_1$ and $36_2$, by optical sources $40_{1, 2, 6 \& 7}$ can be supplied over the entire Raman pump wavelength range for a distributed Raman amplifier, while the dedicated pump power provided by optical sources $40_{3 \& 8}$ can include one or more bands or the pump wavelength ranges. Alternatively, the shared pump power could be provided over one or more bands over the pump wavelength range. Similarly, the shared pump power provided by the four optical sources, $40_{4-5}$ and $40_{9-10}$, to amplification sections, $36_3$ and $36_4$, can be supplied in the same or different pump wavelengths.

The first and second amplification sections, $36_1$ and $36_2$, are shown as part of separate distributed and discrete amplifiers, $24_1$ and $24_2$. The distributed amplifier $24_1$ can be a Raman amplifier or a distributed erbium amplifier and the fiber can be standard transmission fiber or a special purpose fiber, such as dispersion compensating fiber. Similarly, the discrete amplifier $24_2$ can be an EDFA or a Raman amplifier that employs dispersion compensating fiber or other fiber.

The FIG. 6 embodiment is depicted with pump power being provided to amplifiers 24 used to amplify signal channels $\lambda_{si}$ travelling opposite directions. It will be appreciated that the present invention can be used with amplifiers 24 on one or more fibers and in one or more systems that can provide for uni- or bi-directional signal channel transmission. In addition, while the third and fourth amplification sections, $36_3$ and $36_4$, are depicted as two stages of a third optical amplifier $24_3$, these sections can be included in two separate optical amplifiers.

Figure 7:
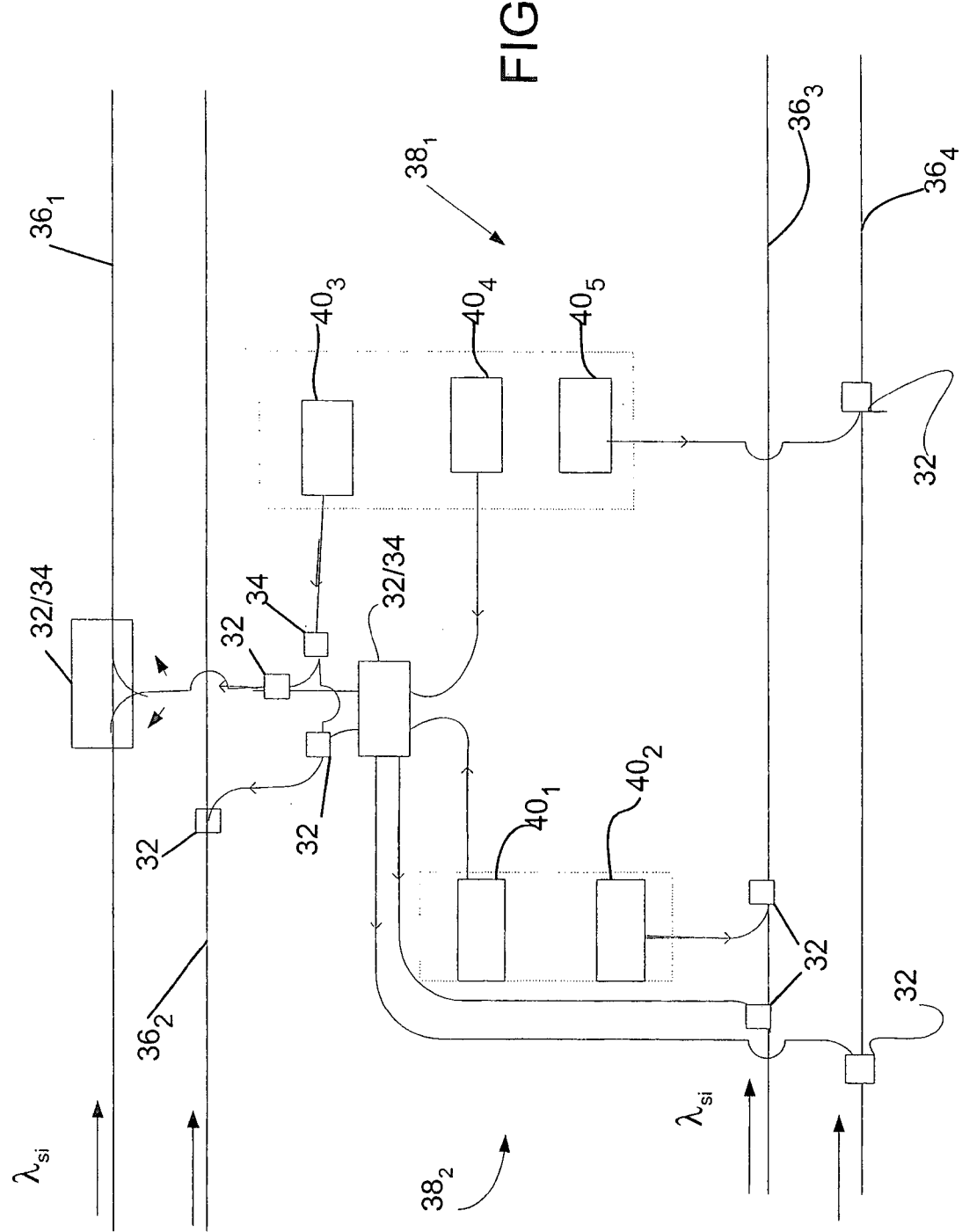

FIG. 7 shows an exemplary embodiment in which multiple levels of pump power sharing can be accommodated depending upon the number of different amplification sections 36 sharing the pump power. Two shared optical sources, $40_1$ and $40_4$, provide pump power to four amplification sections $36_{1-4}$. One shared optical source $40_3$ provides pump power to two amplification sections $36_{1-2}$. Two dedicated optical sources, $40_2$ and $40_5$, provide dedicated pump power to amplification sections $36_3$ and $36_4$, respectively. Fiber lasers, master optical power amplifiers ("MOPA"), and other high power lasers may be deployed efficiently as shared optical sources 40 in applications where pump power is to be supplied to a large number of amplification sections. The fiber lasers can supply sufficiently high power that it can be split multiple times and used to pump amplification sections, which, also amortizes the cost of the fiber laser over the multiple amplification sections. See, for example, U.S. Pat. No. 6,344,925.

Figure 8:
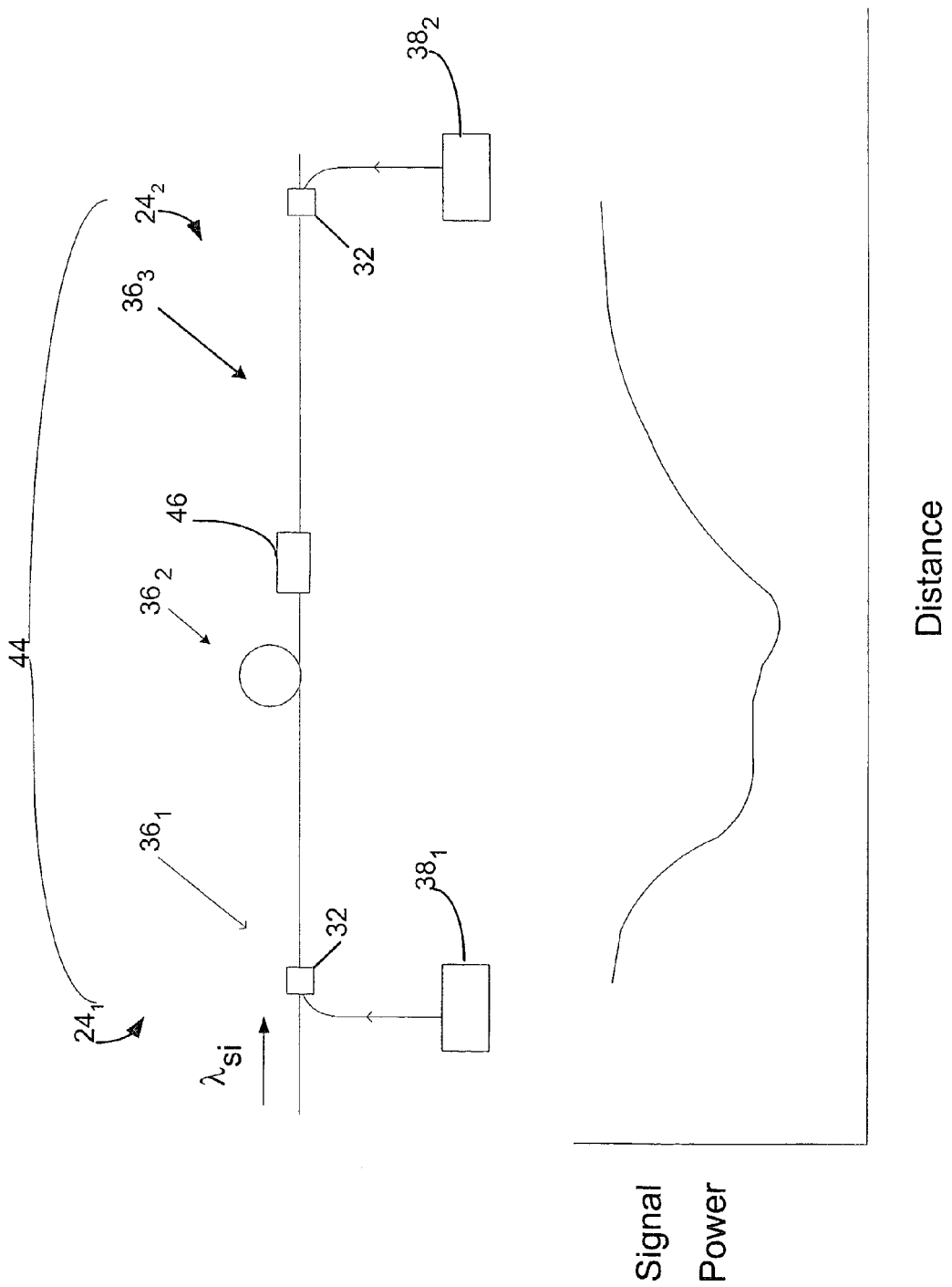

Turning to FIG. 8, the amplification sections can be locally or remotely located relative to the pump sources, as previously discussed. In various embodiments, erbium fiber, dispersion compensating fiber, other small core fibers can be remotely located from the pump sources to provide remote gain in a transmission span.

In addition, the use of remotely pumped dispersion compensating fiber allows dispersion compensation to be performed when the signal channel power is low and provides gain to overcome the loss of the dispersion compensating fiber. Low power dispersion compensation generally decreases the extent of non-linear interactions between the signal channels in the dispersion compensating fiber.

FIG. 8 shows an embodiment of a remotely located amplification section $36_2$, such as non-transmission fiber, that can be used alone or in combination with other non-amplification components 46, such as filters, etc. along a span 44 in the system 10. The discrete amplification section $36_2$ is remotely located from adjacent optical amplifiers, $24_1$ and $24_2$. It will be appreciated that the system 10 can include multiple spans including a plurality of optical amplifiers. The optical amplifiers, $24_1$ and $24_2$ are depicted as including distributed amplification sections $36_1$ and $36_3$ supplied with pump power from pump sources $38_1$ and $38_2$, respectively. It will further appreciated the optical amplifiers, $24_1$ and $24_2$ can include other discrete and/or distributed amplification sections. For example, one or both of the optical amplifiers, $24_1$ and $24_2$ can include amplification sections 36 that are supplied with both shared and dedicated pump power from one or more pump sources 38 as described herein.

In the FIG. 8 embodiment, the pump power can pass through and provide Raman gain in amplification sections 36₁ and 36₃, as well as passing through and providing Raman gain in amplification section 36₂. In some instances, it may be desirable to include an isolator in device 46, so that only pump power from pump source 38₂ reaches the discrete amplification section 36₂. It will also be appreciated that pump power need only be provided from one of the adjacent optical amplifiers and need not necessarily be provided along the transmission fiber or in that case from an adjacent optical amplifier.

The location of DCF or other fibers with different core diameters relative to the point of maximum signal channel power in the span between discrete amplifier locations can be varied by the skilled artisan. For example, some dispersion compensating fibers often have effective cross-sectional core diameters that are on the order of half the diameter of standard single mode fiber. As such, if these fibers are deployed remotely from the point of maximum power in the span by approximately 6 dB or more, then the magnitude of non-linear interactions in the DCF would be comparable to or less than those occurring in a comparble length of the standard single mode transmission fiber.

When DCF is deployed remotely in a lower signal power portion of a network, the core size properties of the DCF can be used advantageously. For example, more Raman gain for a given amount of pump power than would be achievable with nearly all transmission fibers without the associated non-linear degradation, because of the low signal channel powers. Thus, the DCF can be positioned along the transmission fiber, so as to provide lower non-linear interactions and a lower effective noise figure than would be achievable placing the DCF proximate and within discrete amplification section, as in the prior art. For example, DCF can be used as a discrete amplification section and placed in a lower power portion of a span, such that the incremental non-linear phase shift introduced by the DCF is less than the incremental non-linear phase shift introduced by a comparable length of transmission fiber. Placement in this manner will increase the optical signal to noise ratio of the signal channels, because the non-linear degradation contribution to the noise will be decreased relative to placement the DCF proximate or within the adjacent optical amplifers.

Similarly, the DCF or other fiber can be discretely placed remote to the adjacent optical amplifiers, such that the Raman gain that occurs in the remote amplification section raise the minimum signal power experienced in the span. Placement in this manner will increase the optical signal to noise ratio of the signal channels, because the minimum signal power in the span will be increased for the same maximum signal channel power relative to placement the DCF proximate or within the adjacent optical amplifers. As such, one of ordinary skill can place the remote DCF amplification section at various points in a span to improve the optical signal to noise figure of the signal channel passing through the span relative to the optical signal to noise figure of the signal channel, when the DCF is placed proximate or within the adjacent optical amplifers.

FIG. 8 also depicts an exemplary, hypothetical signal power profile through thespan 44 including the remote amplification section 36₂. As depicted the signal power decreases along the span in amplification section 36, until the signal reaches the remote amplification section 36₂. In the FIG. 8 depiction, the remote amplification section 36₂ receives pump power from first and second pump sources, 38₁ and 38₂, and provides sufficient gain to maintain the signal power through the section. Thereafter, the signal power continues to decrease until sufficient gain is provided in distributed amplification section 36₃, which is provided with pump power from pump source 38₂.

The pump power can be propagated to the remote amplification section via the same fiber that carries the optical signals, which also can be used to provide distributed Raman amplification depending upon the relative wavelength differential between the pump power and signal channels. The pump power can be co- and/or counter-propagated with the signal channels $\lambda_{si}$. Alternatively, the pump power can be delivered via a separate transmission path.

A number of factors, such as span and DCF loss, achievable remote Raman, signal channel powers, available real estate, etc. can be considered by one of skill in locating the remote amplification sections and/or other optical components, such as filters, etc. For example, it may be desirable to locate a remote DCF at a location where sufficient gain can be achieved from remote Raman amplification to overcome the loss of the DCF and provide some additional gain in the span. In other situations, it may be more desirable to locate the DCF or other components in pre-existing buildings in the network.

In addition, the amount of DCF or other fibers placed remote to the adjacent amplifiers that is used to improve the OSNR can be varied by the skilled artisan. For example, it may be desirable to provide dispersion compensation in an amount more, less, or equal to the amount of dispersion compensation required for a span of transmission fiber. For example, it may be desirable to provide more dispersion compensation in one span and provide less or none in another span, because, for example, the lengths of the spans may be different and/or the amount of available pump power for Raman gain may be different.

In operation, the shared and dedicated pump power provided to the amplification sections 36 can be fixed or varied dynamically depending upon how the optical systems 10 is operated. In various applications, the shared pump power will be provided at a fixed power and the dedicated pump power will be fixed or varied dynamically to provide the required power to the amplification section 36. Various embodiments can be used to provide dedicated and shared pump power to one or more amplifiers 24 colocated at a geographic location in a network and treated as one or more network elements to support uni- or bi-directional signal channel transmission in one or more systems 10.

Additionally, in various embodiments, the shared source can be configured to provide power to different numbers of amplification sections 36 to facilitate various network procedures. For example, amplifier turn-up procedures can be facilitated by configuring the shared source to provide power to only one amplification section. After the turn-up procedure is completed, the shared source can be configured to share power with multiple amplification sections 36 during operation. Also, network control procedures can be used to prevent power from being supplied to one or more amplification sections. This functionality supports eye safety procedures, if shutdown of less than all of the amplification sections becomes necessary, such as in the event of a fiber break affecting less than all of the amplification sections.

Shared source embodiments that allow power to be turned off to less than all of the amplification section can be provided in various manners. For example, mechanical switches or variable attenuators can be coupled to the output ports of a passive coupler/splitter used to distribute shared optical power. The switches and attenuators can be monitored and operated under hardware and/or software control. Also, dynamic splitters that can be used to vary the power split ratio between the output ports can be used.

The present invention can be embodied in many specific configurations. For example, 980 nm pump power can be shared between two erbium doped fiber amplifiers ("EDFA") and used to pump the erbium in the same direction as the signal channels. Whereas, dedicated 1480 nm pump power can be used to pump the erbium in the direction opposite to the signal channels $\lambda_{si}$. The erbium doped fiber could be a single, continuous amplification section or multiple amplification sections separated into stages via non-amplification sections. For example, the 980 nm and 1480 nm pump power could be supplied to the same erbium doped fiber or to separate sections of erbium doped fiber separated by non-erbium doped fiber. See, e.g., U.S. Pat. No. 5,140,456.

It will be appreciated that the present invention provides for improved transmission systems with increased reliability and performance. Those of ordinary skill in the art will further appreciate that numerous modifications and variations that can be made to specific aspects of the present invention without departing from the scope of the present invention. It is intended that the foregoing specification and the following claims cover such modifications and variations.

What is claimed is:

1. An optical system comprising:
   at least one transmitter;
   at least one receiver configured to receive at least one optical signal from said at least one transmitter;
   a transmission fiber configured to carry the optical signals from said at least one transmitter to said at least one receiver;
   a plurality of optical amplifiers configured to amplify optical signals being transmitted from said transmitter to said receiver through the transmission fiber; and,
   at least one dispersion compensation fiber ("DCF") configured to receive pump power to provide Raman gain to the optical signals passing through the DCF, wherein the DCF is discretely placed remote from said optical amplifiers along the transmission fiber, such that the optical signal to noise ratio of the optical signals is greater than when the DCF is placed proximate or within one of said optical amplifiers.

2. The system of claim 1, wherein the DCF is placed remotely from said optical amplifiers, such that the non-linear interactions in the DCF is less than in a comparable portion of the transmission fiber proximate the optical amplifiers and the Raman gain in the DCF compensates for at least a portion of the loss through the DCF.

3. The system of claim 1, wherein the DCF is placed remotely from said optical amplifiers, such that the optical signal channel power is at least 6 dB less than the signal channel power proximate to said optical amplifier.

4. The system of claim 1, wherein the DCF is placed remotely from said optical amplifiers, such that the incremental non-linear phase shift in the DCF is less than in a comparable portion of transmission fiber.

5. The system of claim 1, wherein the DCF is placed remotely from said optical amplifiers, such that the effective noise figure of a span containing the DCF is less than, when the DCF is placed proximate at least one of the optical amplifiers in the span.

6. The system of claim 1, wherein the DCF is placed remotely from said optical amplifiers, such that the minimum signal channel power in a span including the DCF is higher than the minimum signal channel power for the same maximum signal power, when the DCF is placed proximate at least one of the optical amplifiers in the span.

7. The system of claim 1, wherein the DCF is remotely positioned to provide a remote discrete Raman amplifier.

8. The system of claim 1, wherein said DCF includes a portion of a second transmission fiber having different dispersion properties than the transmission fiber in the system.

9. The system of claim 1, wherein the DCF is remotely located to provide sufficient Raman gain to overcome loss associated with the optical signals passing through the DCF.

10. The system of claim 1, wherein the DCF is remotely located to provide Raman gain in excess of loss associated with the optical signals passing through the DCF.

11. The system of claim 1, wherein at least one of the optical amplifiers includes a distributed Raman amplification section that provides pump power to the DCF to provide Raman gain.

12. The system of claim 1, wherein at least one of the optical amplifiers includes a distributed Raman amplification section that provides pump power to the DCF to provide Raman gain and the pump power is counter-propagating to the optical signals.

13. The system of claim 1, wherein optical amplifiers adjacent to the DCF include a distributed Raman amplification section that provides pump power to the DCF to provide Raman gain.

14. The system of claim 1, wherein the DCF compensates for at least a portion of chromatic dispersion induced in a span including the DCF.

15. The system of claim 1, wherein the DCF compensates for more chromatic dispersion than is induced by the transmission fiber in a span including the DCF.

16. The system of claim 1, wherein said plurality of optical amplifiers includes a first optical amplifier having at least a first optical amplification section supplied with power from at least one shared source that further provides power to at least a second optical amplification section and at least one dedicated source that provides power to only one optical amplification section.

17. The system of claim 16, wherein said shared source and said dedicated source provide power to the same amplification sections of said first optical amplifier.

18. The system of claim 16, wherein said shared source and said dedicated source provide power to the different amplification sections of said first optical amplifier.

19. The system of claim 16, wherein said dedicated source provides power to a third optical amplification section only.

20. The system of claim 16, wherein said at least one shared source supplies power to a first plurality of optical amplifiers that includes a plurality of optical amplification sections.

21. The system of claim 16, wherein said first and second optical amplification sections are two stages in said first optical amplifier.

22. The system of claim 16, wherein said second optical amplification section is part of a second optical amplifier.

23. The system of claim 22, wherein said second optical amplifier is configured to amplify optical signal transmitted from at least one second transmitter to at least one second receiver.

24. The system of claim 23, wherein said second optical amplifier is not configured to amplify optical signal transmitted from said at least one first transmitter to said at least one first receiver.

25. The system of claim 22, wherein said first and second optical amplifiers are provided on different transmission paths.

26. The system of claim 16, wherein:
- said at least one first transmitter is at least one of a plurality of first transmitters;
- said at least one first receiver is at least one of a plurality of first receivers; and,
- said first optical amplifier is configured to amplify optical signals being transmitted from said plurality of first transmitters to said plurality of first receivers.

27. The system of claim 16, wherein said first and section amplification sections include:
- optical amplifying fiber coupled to said shared source; and,
- said shared source includes a plurality of optical sources coupled to passive splitter to provide shared pump power to at least said first and second amplification sections.

28. The system of claim 27, wherein said passive splitter is configured to provide substantially equal pump power to each amplification section.

29. The system of claim 27, wherein said amplifying fiber is erbium doped fiber and said optical sources include lasers that supply power in at least one of the 980 nm and 1480 nm wavelength ranges.

* * * * *